(12) United States Patent
Wang

(10) Patent No.: US 9,910,345 B2
(45) Date of Patent: *Mar. 6, 2018

(54) PROJECTOR HOUSING FOR UNDERWATER PROJECTION

(71) Applicant: Jiansheng Wang, Plano, TX (US)

(72) Inventor: Jiansheng Wang, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/360,026

(22) Filed: Nov. 23, 2016

(65) Prior Publication Data

US 2017/0075202 A1 Mar. 16, 2017

Related U.S. Application Data

(63) Continuation-in-part of application No. 13/748,358, filed on Jan. 23, 2013, now Pat. No. 9,535,313.

(51) Int. Cl.
| | |
|---|---|
| *G03B 21/14* | (2006.01) |
| *G03B 21/16* | (2006.01) |
| *G03B 21/54* | (2006.01) |
| *G03B 21/60* | (2014.01) |

(52) U.S. Cl.
CPC ............ *G03B 21/16* (2013.01); *G03B 21/14* (2013.01); *G03B 21/145* (2013.01); *G03B 21/54* (2013.01); *G03B 21/60* (2013.01); *Y10T 29/49117* (2015.01); *Y10T 29/49826* (2015.01)

(58) Field of Classification Search
CPC ......................... G03B 21/608; F21W 2101/04
See application file for complete search history.

(56) References Cited

U.S. PATENT DOCUMENTS

| | | | |
|---|---|---|---|
| 9,535,313 B2* | 1/2017 | Wang | ............... G03B 21/16 |
| 2013/0215012 A1* | 8/2013 | Reddy | ............... G09G 5/10 |
| | | | 345/156 |
| 2013/0215394 A1* | 8/2013 | Reddy | ............... G09G 5/10 |
| | | | 353/31 |
| 2014/0085613 A1* | 3/2014 | Doyle | ............. G03B 21/608 |
| | | | 353/69 |

* cited by examiner

*Primary Examiner* — William C Dowling
(74) *Attorney, Agent, or Firm* — Paul D. Lein, Esq.; Locke Lord LLP

(57) ABSTRACT

A housing apparatus for projection in a liquid environment includes an enclosure adapted to be positioned in the liquid environment and an exhaust tube connected to the enclosure and air environment to dissipate heat generated by a projector placed inside of the enclosure by air exchange. The projector is adapted to project an image on a projection surface in the liquid environment.

12 Claims, 3 Drawing Sheets

PROJECTOR HOUSING FOR UNDERWATER PROJECTION

CROSS REFERENCE TO RELATED APPLICATIONS

This application claims the benefit of U.S. Provisional Applications 61/701,272 and 61/701,288 both filed Sep. 14, 2012, which are incorporated by reference herein in their entirety. The present application is a continuation in part of application Ser. No. 13/748,358 filed on Jan. 23, 2013 which is incorporated by reference in its entirety.

FIELD

The present disclosure is directed toward projection systems for underwater projection and methods of use, and more particularly to housing systems for underwater projection and methods for using a non-waterproof projector in a liquid environment.

BACKGROUND

An increase in human underwater activities has led to the development of tools to assist humans in underwater environments. Underwater transportation systems (e.g. submarines), underwater exercise equipment (e.g., underwater treadmills), and underwater image capture equipment (e.g., waterproof cameras) are examples of tools to assist humans in underwater environments. Modern image projection systems are designed for operation in dry environments and are currently unsuitable for direct use in liquid environments. There exists a need for projection systems that provide quality image projection and robust display capability in a liquid environment and capable to use a large number of common projectors.

BRIEF DESCRIPTION OF THE DRAWINGS

The present disclosure is best understood from the following detailed description when read with accompanying figures. It is emphasized that, in accordance with the standard practice in the industry, various features are not drawn to scale and are used for illustration purpose only. In fact, the dimension of the various features may be arbitrarily increased or reduced for clarity of discussion.

DETAILED DESCRIPTION

Figure 1:
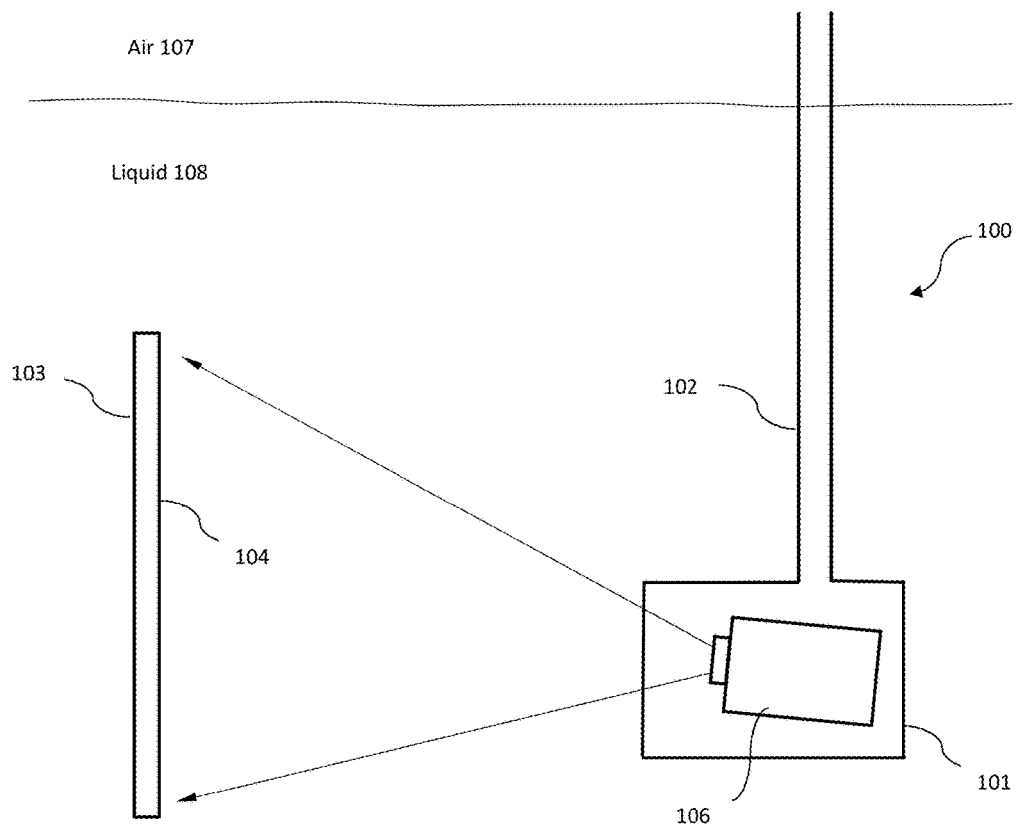
FIG. 1 is an exemplary diagram of a liquid environment projection system according to one or more embodiments of the disclosure.

The following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As used herein the term "projector housing" or "projector enclosure" or "projector case" means a device or apparatus or system to hold a projector(s), respectively, formed using various classes of waterproof materials. In general, liquid environment projection systems may enhance underwater experiences and capabilities for both humans and animals. For example, underwater projection systems may provide information into an underwater environment for use in entertainment, medical treatment, engineering, manufacturing, or research activities. Underwater projection systems may display images visible to viewers, including humans and animals. Thus, the underwater projection systems may influence the viewer's underwater experience. Projecting underwater images either with or without audio may also allow researchers to communicate with and study animals in an underwater environment.

In general, the concept of underwater projection is a significant different from a common projection in air. Since the projection environment or projection media is changed from air to water, most of projector's components designed for use in air will not mechanically work in the underwater environment. Projection phenomena were discovered over a thousand years started using fire. Electrical projectors have been developed over a hundred years. Thousands types of common projectors with many features are designed for use in air over the history of using electrical projectors. It is impossible to modify a large number of existing common projectors into a water-proof projector with a waterproof outer skin and a liquid cooling system similar to what taught in prior art JP2008-216412. At least, such modifications are costly. There is a need for a device or system which allows to use common projectors in underwater environment. This invention provides such advantages along with other advantages and solves a long-lasting problem of which a common projector can't be used in a underwater environment.

Projector Housing for Underwater Projection

For a long time, common projectors are designed for use in air. A water-proof projector may be an idea of new type of projector which may be used for underwater projection, but such approach requires a lot of efforts, changes and costs in projector's device, structure and materials to meet requirements of use in underwater environment, especially a difficulty to dealing with large heat generated by a projector. Currently a waterproof projector is not commercially available yet. In comparing to a long history of development of technologies for projection in air and massive common projectors for use in air, underwater projection is a relatively new concept or activity which is not fully developed yet. Beside difficulty of making a waterproof electronical device, making a projector itself waterproof has one of major disadvantages of which such approach can't use a large number of existing common projectors with all kinds of features and functions. In addition, it is more difficult to make an electronic projector for underwater use than use in air, therefore, cost for making a waterproof projector may be high. This invention provides a new method and a new housing system which is able to achieve underwater projection by using a large number of existing common projectors. Using a newly designed projector housing to hold a common projector may meet requirements of underwater projection and bring some unexpected results with advantages of easy, simple, low cost and able to use all of existing projectors. Due to increased underwater activities in recent years, the special housing designs or apparatus will become more important and useful for various purposes including many uses for entertainment, health, training, education, commercial and technical purposes as mentioned in US 2014/0078409. The present invention includes several new features, combinations and uses.

It is best to understand the present invention with accompanying figures. Referring now to FIG. 1, an apparatus 100 for liquid environment projection is illustrated according to an embodiment of the present disclosure. The apparatus includes a projection display member 103 with a projection surface 104 and a projector 106 for projecting an image on to the projection surface 104. As shown in FIG. 1, portions of the apparatus 100 are installed in liquid 108. Suitable liquids may include, for example, fresh water or salt water. Generally, the liquid may be clear but colored liquids or liquids containing suspended solid particles may also be suitable. The liquid may be contained, for example, in an indoor or outdoor man-made enclosure such as a pool or aquarium or in a natural water formation such as a lake or sea. A man-made enclosure may include a tank or other vessel sealed or otherwise made watertight.

As shown in FIG. 1, the projection display member 102 is positioned in the liquid 108. The projection surface 104 faces the projector 106 and receives an image (e.g., still image, video image) which may be a two- or three-dimensional image from the projector 106. The projection display member 102 may be a wall of a liquid enclosure, such as a wall of a pool. Other suitable projection display member materials may include 3G Switchable Film, textiles, wood, plastic, fiberglass, metal, inorganic material (e.g., stone, ceramic) or a combination materials. In various embodiments, the projection surface may be chemically treated to repel or block liquids.

The projector 106 may be any type of a common image projector including, for example, an image projector such as a video or still image projector designed for use in air. The projector is housed in a projector enclosure 101 that prevents liquid from accessing the projector that would be damaged by liquid 108. The projector 106 is installed to face and transmit an image toward the projection surface 104. Heat generated by the projector 106 may be dissipated by an air exchange to an adjacent air environment 107 through an exhausting tube 102.

Figure 2:
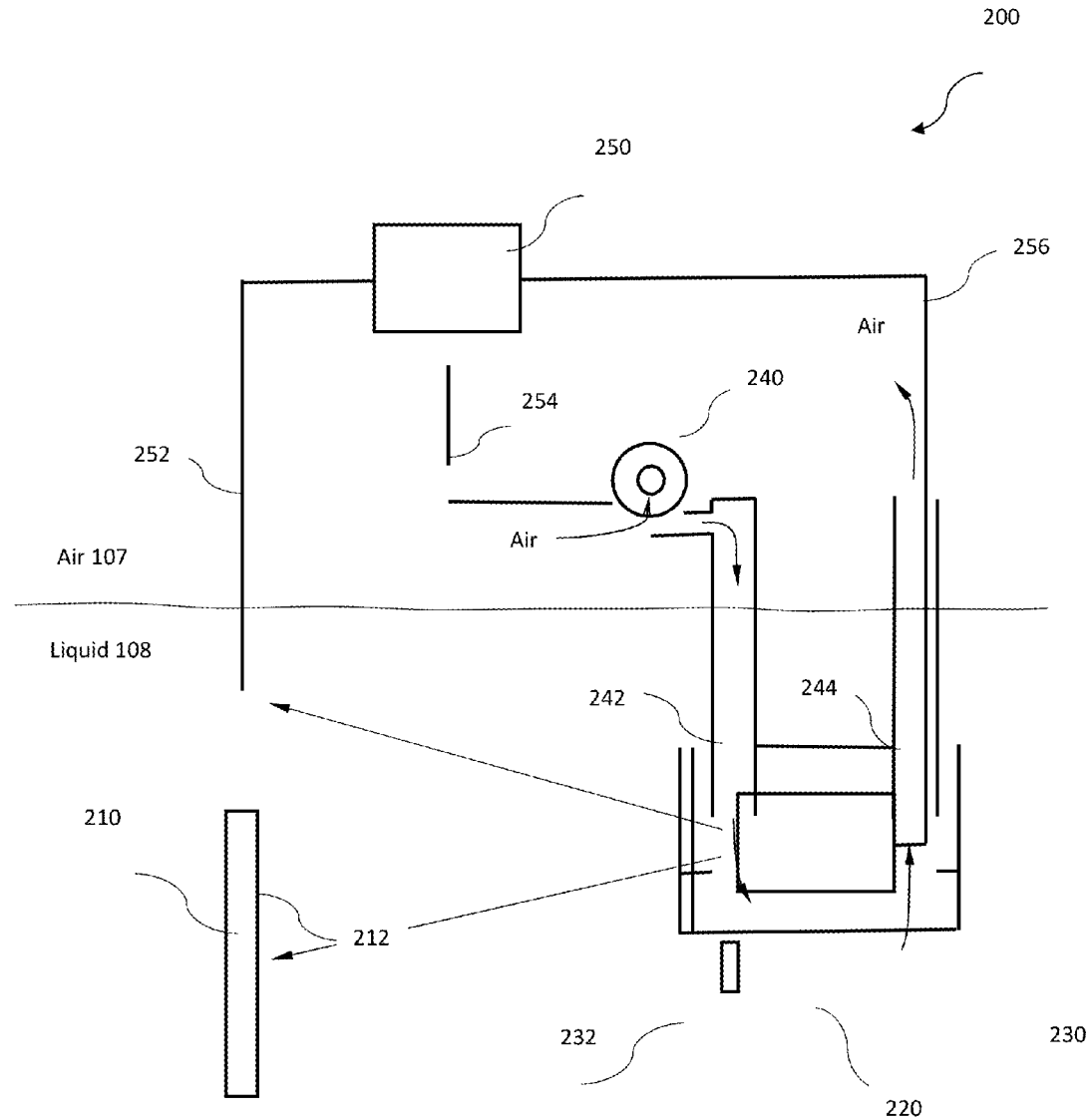
FIG. 2 is an exemplary diagram of a liquid environment projection system with an air cooling according to one or more embodiments of the disclosure.

Referring now to FIG. 2, a underwater projection system 200 using a housing apparatus for liquid environment projection is illustrated according to one or more embodiments of the present disclosure. The underwater projection 200 is an example embodiment and is not intended to limit the present invention beyond what is explicitly recited in the claims. The projection system 200 includes a projection screen 210, a projector 220 such as a common air projector, an enclosure 230, a clear panel 232 (also as a part of the enclosure 230), a blower 240, an exhausting tubing 242 and an exhaust tube 244, an electrical power supply 250, and electrical supply cords 252, 254, 256. However, other configurations and inclusions or omissions to the system 200 may be possible. As shown in FIG. 2, portions of the underwater projection system 200 are installed in liquid. Although the liquid may be referred to as water in this embodiment, suitable liquids may include, for example, fresh water or salt water. Generally, the liquid may be clear but colored liquids or liquids containing suspended solid particles may also be suitable. The liquid may be contained, for example, in an indoor or outdoor man-made enclosure such as a pool or aquarium or in a natural water formation such as a lake or sea. A man-made enclosure may include a tank or other vessel sealed or otherwise made watertight.

The projection screen 210 is submerged in the water. The projection screen 210 includes a projection surface 212 that faces the projector 220 and receives an image in the form of light energy directed from the projector 220 toward the projection surface 212. The projection screen 210 may be connected to the electrical power supply 250 through the electrical cord 252. In this embodiment, the projection screen 210 includes a switchable liquid crystal switchable film such as non-homogenous polymer dispersed liquid crystal display (NPD-LCD) or commercially called 3G Switchable Film with a unique feature of 360 degree viewable. The submersed projection screen 210 may be switched between a transparent (clear) state and an opaque state with or without an electrical voltage. Alternatively or additionally, the projection screen includes a wall of a liquid enclosure, such as a wall of a pool. Other suitable projection screen materials may also be used, including organic materials such as textile, wood, or plastic; inorganic materials such as fiberglass, metal; or combinations of organic and inorganic materials.

The projector 220 may be any form of a light-based image projector including, for example, an image projector such as a video or still image projector. The projector 220 is housed into the enclosure 230 and installed to face and transmit an image toward the projection surface 212. The projector 220 is connected to the power supply 250 by the electrical cord 256. The image generated from the projector 220 passes through the clear panel 232 and projects onto the projection screen 210.

The enclosure 230 for housing the projector 220 may be made with metal, plastic, glass or other materials with a stability in water. The enclosure 230 may include a clear panel 232 (e.g., formed of glass or clear plastic) between the projection display 210 and the projector 220. The clear panel 232 may be a part of the enclosure 230. As shown in FIG. 2, the enclosure 230 is located underwater. The enclosure 230 houses the projector 220 and provides a safe space or room for the projector 220 in an underwater environment. For example, the enclosure 230 is watertight and prevents water from contacting the projector 220. The projector housing may be considered to be formed by two parts, or an enclosure part and an exhausting tubing part. A box shaped enclosure may include four wall panels and top panel and bottom panel, or collectively called walls.

A first end of the first exhausting tubing 242 is connected to the enclosure 230 and a second end of the first exhausting tubing 242 is connected to a blower 240. Second exhausting tubing 244 is also connected to the enclosure 230. A first end of the second exhausting tubing 244 is connected to the enclosure 230 and a second end of the second exhausting tubing 244 is above the water and opens to the environmental air 107. The blower 240 is connected to the enclosure 230 by the first exhausted tubing 242. The blower 240 is also connected to the electrical power supply 250 through the electrical cord 252. The blower 240 provides a cooling medium, such as air, into the enclosure 230 by the first exhausting tubing 242. The heat generated by the projector 220 is dissipated through the cooling medium by the second exhausting tubing 244. Directions of air movement are shown with curved arrows.

The power supply 250 provides power to operate the projector 220 and the blower 240. Since the second end of the second exhausting tubing 244 needs to open to the atmosphere 107, it provides a good chance to allow the wire 256 to connect a projector 220 and a power source or power supply 250. The power supply 250 may also apply an electrical voltage to projection screen 210 to change state of the projection screen between transparent and opaque states.

The projector housing apparatus may be in many different shapes, for example, a rectangle box shape or a cylindered shape. The walls of the housing may be mechanically separated panels or materially joined piece like a casted or injection molded part. The housing may be made in one kind of material or different materials. One or more or all panels used for the housing may be clear or transparent.

Some light bulbs such as LED light bulb or microwave light bulb generate much less heat than mercury light bulb. In such alternative embodiment, the blower may be eliminated. In such case, two exhausting tubes may be separately mounted on the top of enclosure and the bottom of the enclosure, so that a chimney effect may be utilized for better removing away heat generated by the projector 220. For example, relocate first end of the first exhausting tubing 242 to the bottom of the enclosure 230 from the top of the enclosure to allow a cool fresh air to get into the enclosure from bottom of the enclosure and warmed air exhausts from the second exhausting tubing. On other hand, since metal is a better heat conductive media than plastic or glass, heat dissipation may be accomplished with a metal enclosure, therefore, a bottom and sides of the enclosure 230 may be made with metal such as aluminum or stainless steel. In one embodiment, a common projector with its internal fan may move warmed air to outside of the projector, and then the warmed air is replaced with fresh air from first exhausting tubing and moved out from the housing system through the second exhausting tubing and dissipate heat through a metal shell of the enclosure toward the liquid 108. The projector may have a metal shell and/or a corrugated or other high surface area container for efficient heat dissipation. Other enclosure systems with efficient heat dissipation properties may also be suitable. A battery operated projector may be benefited by the use of low heat generating and low energy consumption light bulbs. Such a battery operated projector (without tether to a stationary power source) is also more convenient when displaying projected images in different locations or when moving the projector between locations. In such embodiment, a floater(s) may be attached to second ends of first exhausting tubing and second exhausting tubing. Solar cells may be installed of top surface of the floater to help to change a battery or drive a blower.

In use, an image generated by the projector 220 located inside the enclosure 230 passes through the clear panel 232 and projects on the projection screen 210. The image may include a static image or dynamic continuous image. The heat is dissipated by the first exhausted tubing 242 and the second exhausted tubing 244. For example, the blower 240 provides a cooling medium, such as air, to the enclosure 230 through the first exhausted tubing 242 and dissipates the heat through the second exhausted tubing 244.

An embodiment of the housing system may have one exhausting tubing connecting to the enclosure. A tubing may have a different size and shape. For example, when a first exhausting tubing 242 is smaller than second exhaust tubing 244, the first exhausting tubing may be placed inside of the second exhausting tubing 244. Or both the first exhausting tubing 242 and wiring 256 are inside of the second of exhausting tubing 244. Such structure may be helpful to prevent bending of an exhausting tubing.

Figure 3:
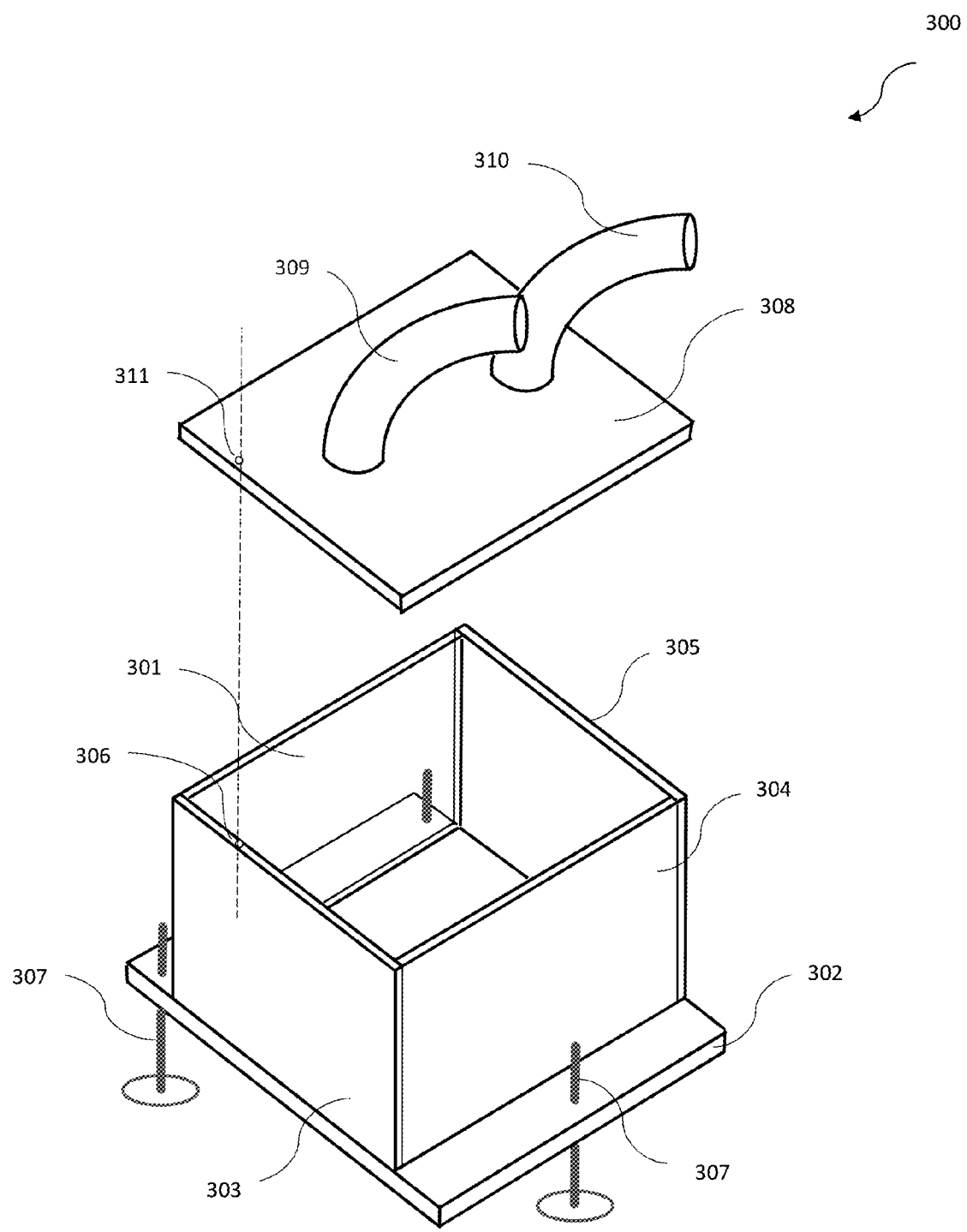
FIG. 3 is an exemplary diagram of a projector housing system according to one or more embodiments of the disclosure.

Referring FIG. 3, an embodiment of the projector housing apparatus 300 is illustrated in a partially disassembled form. The projector housing apparatus 300 includes basically two parts like an opened box with a lid. A bottom panel 302 and four side walls form a body of the box and the top panel 308 and the two exhausting tubes form the lid, so that a projector may be easily placed inside of the housing 300. After closing the lid, the housing apparatus is basically a sealed enclosure with a connection to the atmosphere through two exhausting tubes 309 and 310. When the enclosure part is immersed into water, inside of the enclosure may remain dry and have an air exchange with the atmosphere through the exhausting tubes 309 and 310. The apparatus 300 includes a bottom panel 307, which may be, for example, made by aluminum in thickness 0.75 inch with or without anodizing. Other choices include stainless steel or steel with painted surfaces or plastic. Since the entire projector housing with a projector placed inside should be sank into water to be functional, heavy and non-rusting material like aluminum is a good choice. Four wall panels including clear panel 301, side panel 303, side panel 305 and back panel 304 are mounted on the base panel 302. The clear panel 301 may be, for example, acrylate or polycarbonate in thickness of ½ to ¾ inch. Side panel 303, side panel 305 and back panel 304 may be transparent, non-transparent, plastic or metal, or be, for example, PVC (polyvinyl Chloride). If acrylate material is used as clear panel 301 and PVC is used as the side panels 303 and 305 and back panel 304, a common PVC glue or solvent cement may be used to join these panels together to form a rectangular channel. Screws and glue may be used to mount the walls or the rectangular channel on the bottom panel 302. For example, a screw may be inserted from through holes 311 on the bottom panel 302 into a threaded holes 306 on the side walls. A silicone glue may be used to seal the side walls and the bottom panel 302 at contacting surfaces and inside edges. A top panel 308 may be plastic or metal and be, for example, aluminum in thickness ½ to ¾ inch.

Many closing mechanisms, such as screw and latch, may be used to close and seal the top part, including the top panel 308 and two tubes 309 and 310, on the bottom part, including four side walls and bottom panel, together. A rubber seal ring or plastic gasket may be placed between the top edges of the bottom part and the top part. For example, a screw, through a through hole 311 and a silicone rubber gasket (in thickness 1/32 to 1/16 inch), may be inserted into a thread hole 306 on side panel 303. Multiple screws (such as 14 screws, not shown in FIG. 3) may be used to mount the top part on the bottom part together. The closed housing 300 may be considered to form with two parts or an enclosure part and exhausting tubing part and sealed watertight except openings at ends of the exhausting tubes. A metal or plastic hose fitting may be used to join the top panel 308 and the exhausting tubes together. The first exhausting tubing 309 and the second exhausting tubing 310 may be flexible plastic tubing or metal hose in different length depending a need. Wire enhanced plastic tubing/hose or stainless steel hose or thick wall plastic tube which does not collapse by bending may be used for the tubing 309 and tubing 310. A light weight anti-collapse plastic hose is also good to use, because it is easy to move around. An air delivery rate of a blower is associated with a diameter of hose needed.

As shown in FIG. 3, the bottom panel 302 may be longer or wider than body of the box. Leveling foots or swiveling stud 307 may be installed on the bottom panel 302, and swiveling studs 307 may be made with stainless steel or other materials. Three swiveling studs 307 may be used for leveling the enclosure with a long screws, such as 6 to 12 inch long. Two swiveling studs 307 may be mounted at a front edge close to the clear panel 301 at two corners separately, so that adjusting height does not affect a projection. One swiveling stud 307 may be mounted at a middle of back edge close to the back panel 304 to adjust a tilt angle.

For a specific projector, portion of clear panel 301 or other panels including 303, 304 and 305, may be made with a flexible rubble sheet or a clear plastic sheet, so that original buttons or keys on control panel of the projector may be operated from outside of the housing. Other directional or non-directional controlling technologies, such as remote control or extended mechanic push-button, can be also applied and the side wall panels 303, 304 and 305 or other panels of the housing may be used for mounting new control buttons or keys. Without any of the advanced controlling features mentioned above, the housing still works fine, because closing the lid and sealing the housing is just a simple operation. After setting the projector in the air, it is fine to close the lid and place the housing with a projector inside into water or a swimming pool or lake. Some springs or foam or mounting mechanism may be used for positioning a projector inside of the enclosure.

As illustrated in FIG. 2 and FIG. 3, many embodiments descripted above are able to achieve underwater projection by using a common projector which is not suitable to be directly used in underwater environment. The projector housing extends use or capability of a common projector into underwater environment and has several new functions or features including separating water from a projector, allowing delivery projected images in and through liquid media, removing heat from a projector, meeting a basic requirement of using a common projector designed for use in air, enabling to control a projector placed inside of the housing, easily positioning the housing and projector in a underwater environment, enabling to use a large number of existing common projectors, easy to operate, having a relative low cost to make, suitable for use for both professionals and amateurs, easy to make with a mass production or in home.

The foregoing outlines features of several projector housing embodiments for underwater projection with an air cooling so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A housing apparatus for projection in a liquid environment, the housing apparatus comprising:
   an enclosure; and
   an exhausting tubing, wherein the exhausting tubing connects between the enclosure and an air environment; and
   wherein the housing apparatus includes the enclosure operated being under the liquid environment and connecting to an air environment through the exhausting tubing.

2. The housing apparatus of claim 1 wherein at least a portion of the enclosure is transparent.

3. The housing apparatus of claim 1 wherein the enclosure includes a liquid proof outer casing.

4. The housing apparatus of claim 1 wherein the exhausting tubing connected between the enclosure and the air environment for dissipating heat by an air exchange.

5. The housing apparatus of claim 1 wherein the enclosure is made of plastic or metal or glass.

6. The housing apparatus of claim 1, wherein the housing apparatus further comprises a blower coupled to the housing apparatus through the exhausting tubing.

7. A method of using a housing apparatus for projection under a liquid environment, the method comprising:
   providing a projector placed inside of the housing including an enclosure and an exhausting tubing; and
   positioning the enclosure in the liquid environment while maintaining the exhausting tubing connecting to the enclosure and to an air environment; and
   projecting an image from the projector to a projection surface in the liquid environment.

8. The method of claim 7 wherein at least a portion of the enclosure is transparent.

9. The method of claim 7 further comprising:
   containing the projector in a liquid proof enclosure, wherein projecting the image includes projecting through the housing.

10. The method of claim 7 further comprising:
    dissipating heat away from the projector to the air environment by a means of exchanging air.

11. The method of claim 7 further comprising:
    dissipating heat through a surface of the enclosure toward the liquid environment.

12. The method of claim 7 wherein the projector is AC or DC operated.

* * * * *